(12) United States Patent
Ham et al.

(10) Patent No.: US 8,121,080 B2
(45) Date of Patent: Feb. 21, 2012

(54) BEACON SCHEDULING SYSTEM AND METHOD FOR PREVENTING BEACON OVERLAPPING

(75) Inventors: Young-Hwan Ham, Daejeon (KR); Sun-Joong Kim, Daejeon (KR); Cheol-Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1118 days.

(21) Appl. No.: 11/947,342

(22) Filed: Nov. 29, 2007

(65) Prior Publication Data

US 2008/0137599 A1  Jun. 12, 2008

(30) Foreign Application Priority Data

Dec. 7, 2006  (KR) .................. 10-2006-0124120

(51) Int. Cl.
*H04W 4/00* (2009.01)
(52) U.S. Cl. ......... 370/329; 370/328; 370/315; 370/348
(58) Field of Classification Search .................. None
See application file for complete search history.

(56) References Cited

U.S. PATENT DOCUMENTS

| | | | | |
|---|---|---|---|---|
| 4,009,343 A * | 2/1977 | Markey et al. | ............... | 370/321 |
| 4,009,346 A * | 2/1977 | Parker et al. | .................. | 370/345 |
| 6,658,250 B1 * | 12/2003 | Ganesan et al. | ........... | 455/426.1 |
| 7,636,341 B2 * | 12/2009 | Park | .............. | 370/338 |
| 2004/0042431 A1 * | 3/2004 | Ishikawa | ..................... | 370/337 |
| 2004/0174829 A1 * | 9/2004 | Ayyagari | ....................... | 370/254 |
| 2005/0047428 A1 * | 3/2005 | Park et al. | ..................... | 370/445 |
| 2005/0063319 A1 | 3/2005 | Kyperountas et al. | | |
| 2005/0243765 A1 * | 11/2005 | Schrader et al. | ............. | 370/328 |
| 2005/0243782 A1 * | 11/2005 | Sakoda et al. | ................ | 370/338 |
| 2006/0104241 A1 * | 5/2006 | Kim | .............................. | 370/329 |
| 2006/0104250 A1 * | 5/2006 | Oh et al. | ......................... | 370/338 |
| 2007/0047510 A1 * | 3/2007 | Cho et al. | ...................... | 370/338 |
| 2009/0097464 A1 * | 4/2009 | Sakoda | ......................... | 370/338 |
| 2010/0290421 A1 * | 11/2010 | Morioka | ...................... | 370/329 |

FOREIGN PATENT DOCUMENTS

| | | |
|---|---|---|
| KR | 1020050025053 A | 3/2005 |
| KR | 1020060050947 A | 5/2006 |
| KR | 1020060051124 A | 5/2006 |
| KR | 1020060051174 A | 5/2006 |

* cited by examiner

Primary Examiner — Ian N Moore
Assistant Examiner — Dung B Huynh

(57) ABSTRACT

Provided are a beacon scheduling system and method for preventing beacon overlapping in a ZigBee network including routers each with a beacon slot number according to a specific time slot. The system includes: a first router periodically transmitting beacons at a beacon interval according to a specific time slot; and a second router finding the beacon interval by scanning the beacons transmitted by the first router and transmitting beacons within the beacon interval in consideration of a superframe period for transmitting data. When a router in a sensor network operates, the router can efficiently select the beacon transmission time, and a sink node manages beacon overlapping between all the routers. Therefore, stable, low-energy consumption, and excellent performance sensor networking environments can be established in a beacon mode.

7 Claims, 5 Drawing Sheets

BEACON SCHEDULING SYSTEM AND METHOD FOR PREVENTING BEACON OVERLAPPING

CROSS-REFERENCE TO RELATED PATENT APPLICATIONS

This application claims the benefit of Korean Patent Application No. 10-2006-0124120, filed on Dec. 7, 2006, in the Korean Intellectual Property Office, the disclosure of which is incorporated herein in its entirety by reference.

BACKGROUND OF THE INVENTION

1. Field of the Invention

The present invention relates to a beacon scheduling system and method for preventing beacon overlapping, and more particularly, to a beacon scheduling system and method in which a router existing in a ZigBee network transmits beacons in consideration of a beacon interval by scanning the beacons.

This work was supported by the IT R&D program of MIC/IITA [2005-S-038-02, Development of UHF RF-ID and Ubiquitous Networking Technology]

2. Description of the Related Art

According to a suggested beacon scheduling method in a conventional ZigBee network beacon mode, information on a time slot for transmitting beacons is identified using beacon arrival times of neighbor nodes obtained by scanning information of the neighbor nodes and an offset of a parent beacon of an adjacent node included in a beacon payload.

According to this method, the beacon transmission time slot of a specific router is determined based on the beacon reception time. Therefore, the beacon reception time for each router should be stored to be used to calculate the time slot for each router.

However, a significant problem arising with this method lies in that, if there are routers starting simultaneously scanning beacons, the routers may select the same beacon transmission time slot (hereinafter, beacon slot) almost at the same time, thereby colliding against each other.

To prevent such overlapping, a centralized management method in which a management server or a sink node controls routers to select different beacon slots can be used. However, this method may cause an overload to the management subject and traffic congestion in an initialization process.

In addition, another problem is that the number of beacon slots to be allocated is limited so that the beacon slot of a specific router can be reused out of a radio wave reaching distance of the router. Furthermore, it is not easy to prevent beacon overlapping within the radio wave reaching distance.

SUMMARY OF THE INVENTION

The present invention provides a beacon scheduling system and method for preventing overlapping of beacons transmitted by routers (including a sink node) constituting a sensor network.

The present invention provides a beacon scheduling system and method for efficiently scheduling the points of beacon transmission time at which routers constituting a sensor network transmit beacons, and thereby increasing the data transmission rate.

The present invention provides a beacon scheduling system and method in which a router newly incoming to a sensor network can receive existing beacons without overlapping and determines its own beacon transmission time.

According to an aspect of the present invention, there is provided a beacon scheduling system for preventing beacon overlapping in a ZigBee network including routers each with a beacon slot number according to a specific time slot, the system including: a first router periodically transmitting beacons according to a specific time slot; and a second router finding the beacon interval by scanning the beacons transmitted by the first router and transmitting beacons within the beacon interval in consideration of a superframe period for transmitting data.

The second router may transmit beacons within a beacon interval with an interval equivalent to a predetermined beacon slot period from the beacon transmitted from the second router adjacent to the first router in the ZigBee network.

The beacon slot period may be set as the sum of a superframe period for transmitting data and a beacon protection period shorter than the superframe period.

A beacon slot number of the sink node may be set as "0", the quotient of dividing the beacon interval by the beacon slot period may be defined as the number of slots, an equal number of beacon slot numbers as the number of slots may be allocated, and one of the beacon slot numbers may be allocated to the first router.

According to another aspect of the present invention, there is provided a beacon scheduling method for preventing beacon overlapping in a ZigBee network including routers each with a beacon slot number according to a specific time slot, the method including: (a) identifying beacon slot numbers of routers existing in the ZigBee network by scanning beacons of the routers; (b) selecting a parent router to be connected among the routers; (c) distinguishing unused beacon slot numbers, excluding the identified beacon slot numbers, among beacon slot numbers allocated within a beacon interval; and (d) selecting one of the unused beacon slot numbers and transmitting beacons based on a difference between a beacon slot number of the selected parent router and the selected unused beacon slot number.

(a) identifying the beacon slot numbers of the routers may be achieved by analyzing beacon payloads included in the scanned beacons.

In (d), a beacon slot number adjacent to the beacon slot number of the selected parent router may be selected as one of the unused beacon slot numbers.

In (d), a beacon slot number corresponding to a value obtained as a result of operation with a modular operator may be selected using the value obtained by adding the beacon slot number of the selected parent router to the value of dividing a ZigBee network address of a router which will transmit beacons into a predetermined integer.

(d) may include calculating a delay time according to the difference between the beacon slot number of the selected parent router and the selected unused beacon slot number, and beacons are transmitted after the calculated delay time passes from receiving beacons of the parent router.

If one of the unused beacon slot numbers selected in (d) may be a beacon slot number selected for another router in the ZigBee network, the selected parent router refuses connection of a router which will transmit beacons or transmits a reset command for system initialization to the router which will transmit.

The method may further include (e) transmitting a message from a router with an allocated beacon slot number among the routers in the ZigBee network to a sink node in the ZigBee network, the message containing the allocated beacon slot number of the router and a scan time; and (f) if there is a router with the same allocated beacon slot number or the same scan time as in the message, transmitting a reset command to delete the beacon slot number of one of the two routers.

(f) may include: determining whether an allocated beacon slot number of a router which will transmit beacons is the same as the allocated beacon slot number included in the transmitted message; if the allocated beacon slot numbers of the two routers are the same, calculating a scan time interval using a difference between the scan times of the two routers; and if the calculated scan time interval is not greater than the product of multiplying a beacon interval of the routers by a predetermined integer, transmitting a reset command for system initialization to one of the two routers after the time corresponding to the product passes.

In (f), the reset command may not be transmitted to any routers out of a radio wave reaching distance in which the sink node exists.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Embodiments of the present invention will be described in detail with reference to the appended drawings.

Figure 1:
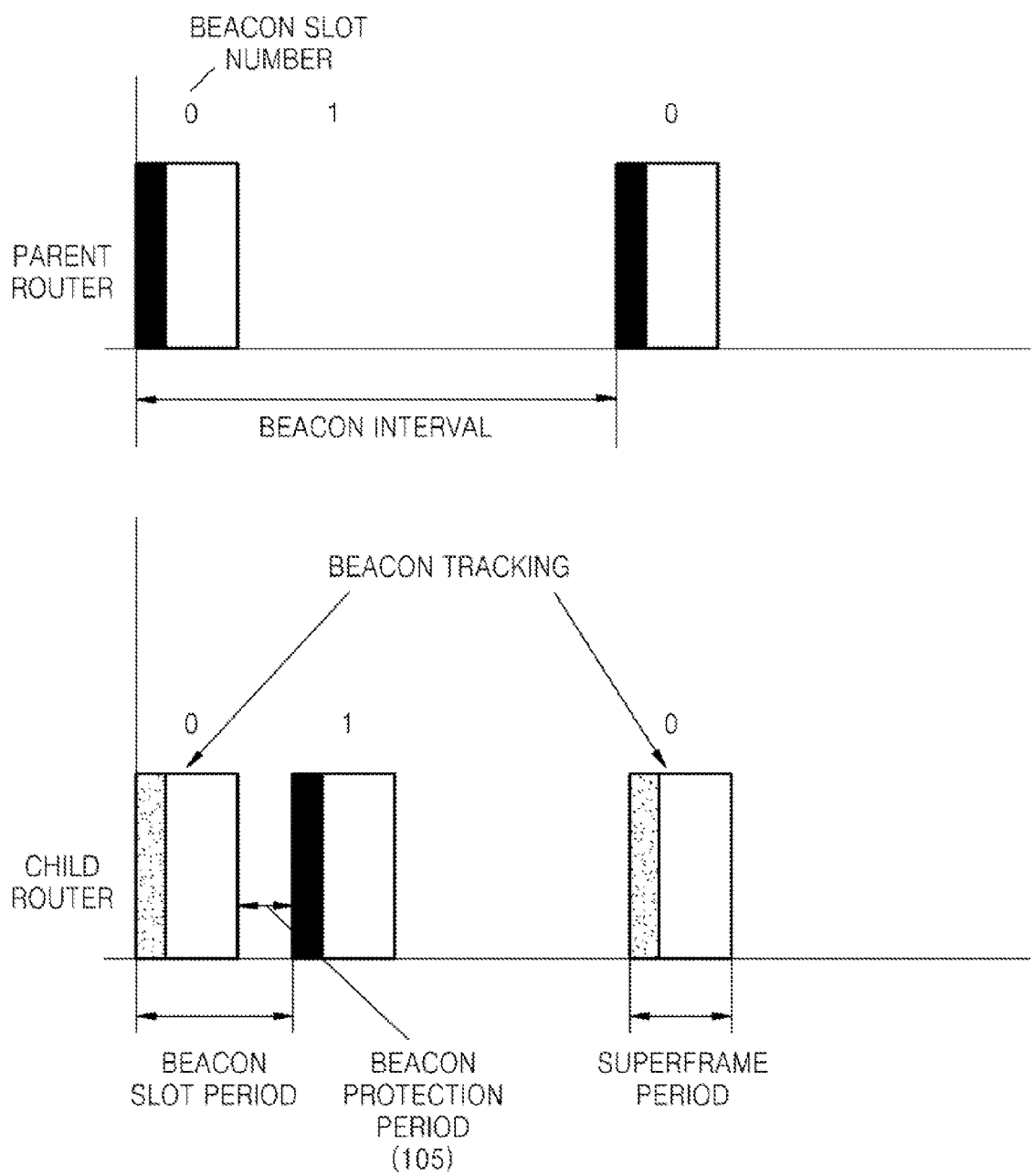
FIG. 1 is a diagram illustrating the concepts of beacon slots, a beacon interval, a superframe period, and a beacon slot period according to an embodiment of the present invention.

FIG. 1 is a diagram illustrating the concepts of beacon slots, a beacon interval, a superframe period, and a beacon slot period according to an embodiment of the present invention.

A beacon slot period as units for allocating a beacon slot number will be described. In a single router beacons are periodically transmitted at a beacon interval. For communication between routers, a child router linked to a network has to track beacons of its parent router at a beacon interval.

A data transmission period immediately following the beacon is a superframe period. In the embodiment, the beacon slot period is defined as a value equivalent to the addition of a beacon protection period 105 to the superframe period so that one beacon does not overlap with another as an error occurs between the routers over time. A smaller value is used for the beacon protection period than for the superframe period.

A beacon slot number is allocated for each beacon in order as follows:

Beacon Interval/(Superframe Period+Beacon Protection Period)=Number of Slots.

A beacon slot number is allocated within the above-determined number range of slots. A sink node is designated as number "0", and the remaining routers select appropriate beacon slot numbers in a way to be described below.

The sink node puts its beacon slot number "0" in its own beacon payload. A router starts beacon transmission with its own beacon slot number and its parent router's beacon slot number put in its beacon payload.

Figure 2:
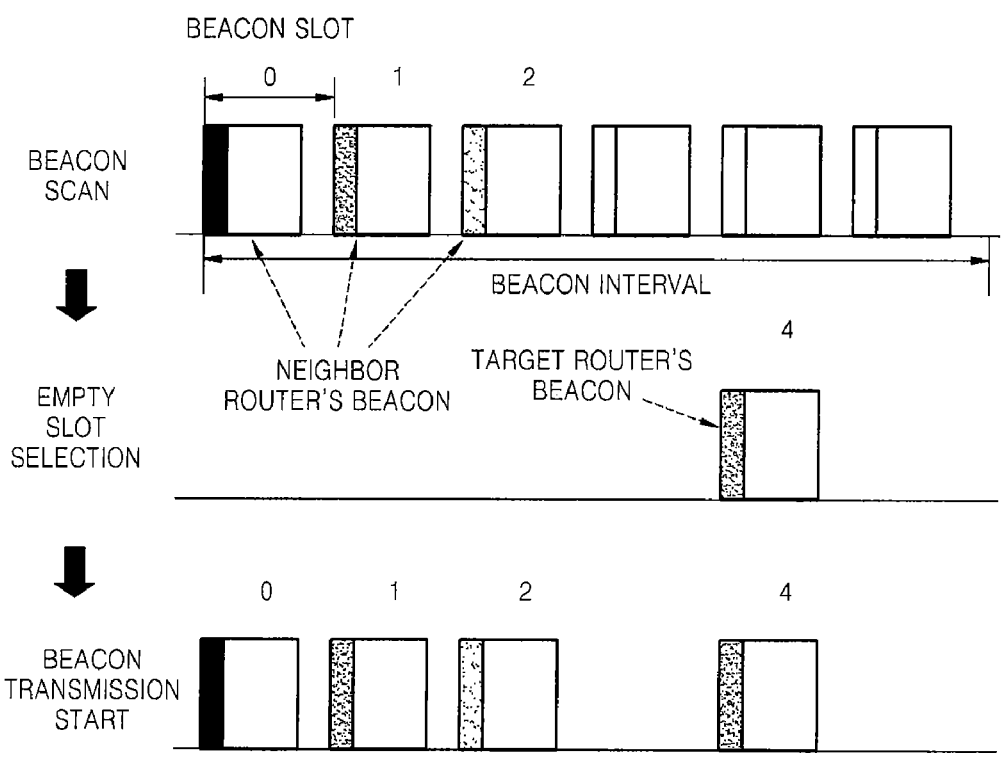
FIG. 2 is a diagram illustrating beacon scanning, slot selection, and beacon transmission processes according to an embodiment of the present invention.

FIG. 2 is a diagram illustrating beacon scanning, slot selection, and beacon transmission processes according to an embodiment of the present invention.

In a first beacon scanning process, all the beacons of adjacent nodes are scanned to find beacon slots in use in each beacon payload.

Each beacon payload contains beacon slot information of a corresponding router and its parent router, so that beacon slot information of an adjacent node and its parent node can be found.

Fundamental beacon scanning and transmission processes are the same as in FIG. 2.

In a second process of empty slot selection, after the beacon slots of the adjacent node and its parent node have been found through the beacon scanning process, slots in use among all the slots are represented in a slot table.

The residual of dividing an allocated address of a node by a total number of slots is determined as a slot of the node. Whether the determined slot is in use is checked with reference to the slot table. If the determined slot is not in use, the slot is selected as the slot of the node.

However, if the determined slot is in use, a slot with the number just ahead of its parent's beacon slot number is selected. As a result, when transmitting sensed data to the parent node, the sensed data can be transmitted to the parent node within the shortest time.

An initial slot number is selected as a value obtained by adding the parent's beacon slot number to the residual of dividing a 16-bit address (e.g., ZigBee network address), which is a unique for each router, by an appropriate value. The exact formula for this is as follows.

"(P−[S/N]+(node address % [S/N]))% S"

If this initial value is determined to be in use as a result of scanning, a slot number with the smallest "(P−empty slot number) % S" among empty slot numbers is selected.

The variables and operators used here are defined as follows.

S: number of slots
N: number of blocks (N=1, 2, 3, 4, . . . )
P: parent's slot number
% modular operator
[ ]: decimals discarded Here, the smaller the block number (N), the smaller the transmission delay when data are transmitted to the parent. However, beacons are simultaneously scanned, overlapping is more likely to occur, so that a small value should be used.

In a third process of beacon transmission, when beacon slot allocation to the router is completed, the router generates a beacon payload by putting together its own beacon slot number and its parent' beacon slot number by one byte each, and then starts transmitting beacons.

The point of time at which beacon transmission starts is set as follows. That is, a difference between the router's own beacon slot number and its parent' beacon slot number is converted as a delay time. Next, the router starts transmitting the beacons after the calculated amount of time has passed from when it has received the beacons from the parent router.

After selecting its own beacon slot number and before starting to transmit its beacons, the router has to transmit an association request to and receive an association response from the parent router.

At this time, the router notifies its association request of the parent router by putting its own slot number in an association request message. The parent router rejects the association request if there are any overlapping slot numbers between child routers, thereby solving the problem of beacon overlapping between the child routers.

Figure 3:
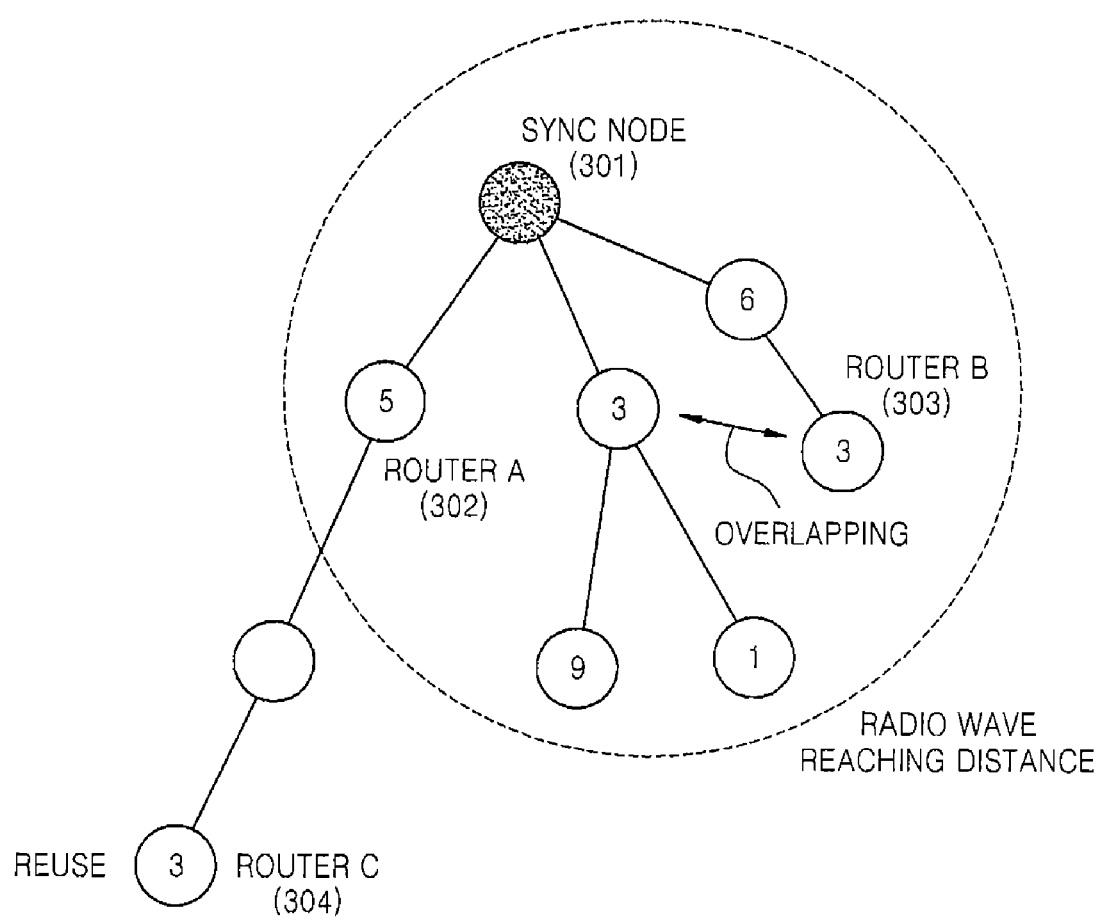
FIG. 3 is a diagram showing a structure of a ZigBee network according to an embodiment of the present invention.

FIG. 3 is a diagram showing a structure of a ZigBee network according to an embodiment of the present invention. Referring to FIG. 3, the ZigBee network includes a sink node 301, and routers A (302), B (303), and C (304).

In other words, FIG. 3 illustrates the state of the ZigBee network after beacon slot numbers have been allocated. As shown in FIG. 3, since router A (302) and router B (303) are within the radio wave reaching distance, which means the distance by which beacons transmitted by a router reach), beacon overlapping occurs when the two routers use the same identical beacon slot number. However, for router A (302) and router C (304) which is out of the radio wave reaching distance, beacon overlapping does not occur between the two routers.

To distinguish the two possible cases, there is used a method of transmitting slot numbers and beacon scan times to the sink node 301 so that the sink node 301 can make a decision. In other words, if router A (302) and router B (303) fail to find the beacons of the other router, it means that router A (302) and router B (303) did simultaneous scanning. At this time, if the beacon scan times are similar as a result of comparison, one of router A (302) and router C (304) is reset inducing its slot number to be chosen again.

Figure 4:
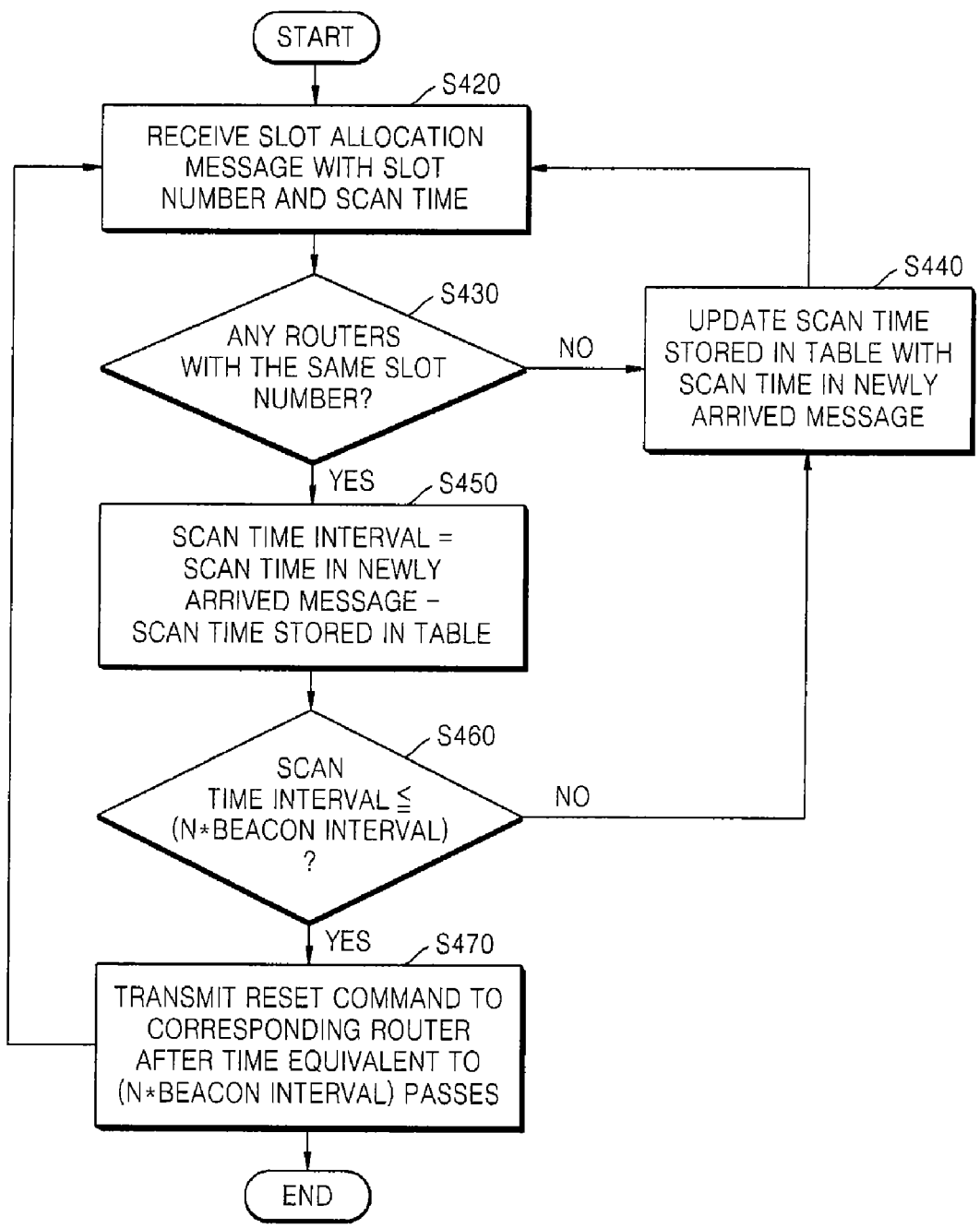
FIG. 4 is a flowchart of a method of preventing overlapping of beacon slots in a sink node according to an embodiment of the present invention.

FIG. 4 is a flowchart of a method of preventing overlapping of beacon slots in a sink node, according to an embodiment of the present invention. This operation in FIG. 4 follows the third process in FIG. 2.

Once all routers have started transmitting beacons, each of the routers transmits a message with its allocated slot number and scan time therein to the sink node (operation S420).

The sink node keeps the information received from each router in a table. If messages with the same slot number are received, which means that the two routers use the same slot, then the sink node checks a likelihood of beacon overlapping (operation S430).

The slot numbers in the table are used as indices. Accordingly, if the scan time item is in a table entry, it is determined that there are routers to which the same slot number has been allocated. If there are no router to which the same slot number has been allocated, the scan time in the corresponding slot number entry in the table is updated with the scan time in a newly arrived message (operation S440).

If there are two routers with the same slot and a scan time interval is calculated as a difference between the scan time in the table and the scan time in the newly arrived message (operation S450). It is determined whether the scan time interval is smaller than or equal to (N*beacon interval), where N=1, 2, 3, 4, . . . (operation S460). If the scan time interval is smaller than or equal to (N*beacon interval), it is regarded that there is a likelihood of overlapping between the two routers, and a reset command is given to one of the operating routers that has most recently transmitted a slot allocation message (operation S470).

If the scan time interval is larger than (N*beacon interval) (operation S460), the scan time in the corresponding slot number entry in the table is updated with the scan time in a newly arrived message (operation S440).

In order to optimize RAM used in the sink node, the beacon scan time is managed in the table in units of beacon intervals, and only the scan time in the most received arrived message is kept in the table. The table is indexed by slot numbers. Thus, the table can be maintained with one byte for each slot number.

A router which has received a reset command repeats from the first process to the third process, and the sink node always processes the slot allocation message as in the fourth process.

In addition to the method of using slot allocation messages as described above, when a router or node is disconnected from the network because it fails to receive beacons more than a predetermined number or when the router or node is relinked to the network, a method in which the corresponding router or node notifies the sink node of this situation and gives a reset command to a router previously linked to the sink node can be used.

In general, even when allocated beacon slots of a neighbor node and its parent node are identified and beacon slots are allocated not to overlap, if scanning on adjacent nodes starts simultaneously, the same slot may be chosen for the nodes leading to beacon overlapping.

A likelihood of beacon overlapping rising due to such simultaneous scanning can be efficiently eliminated by performing a proper process on only one of the nodes with the same beacon slot number.

Since only routers with overlapping beacon slots in a predetermined time interval are chosen based on time information and appropriately processed, there is no need to periodically check the state of routers and return allocated slots.

Figure 5:
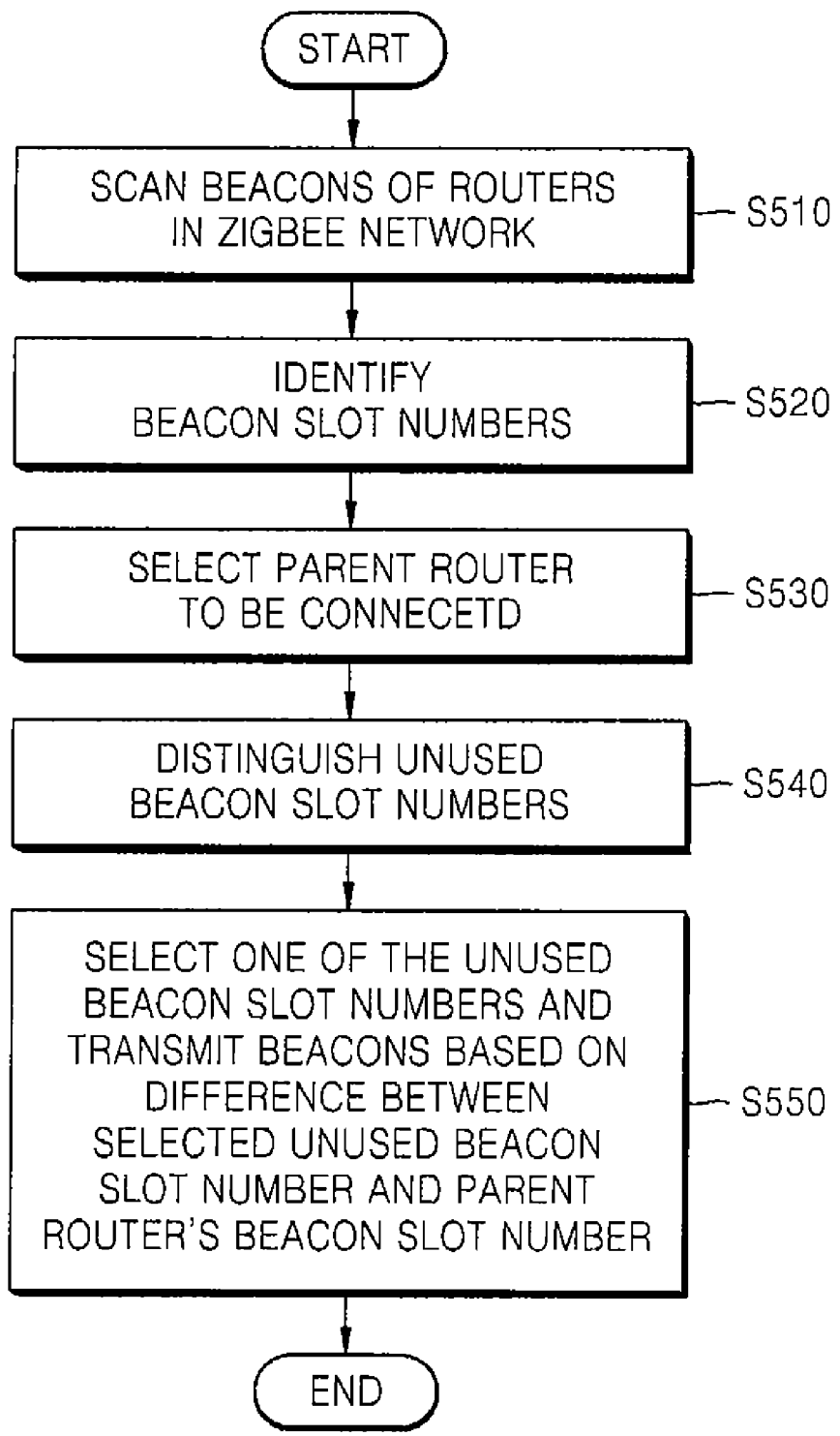
FIG. 5 is a flowchart of a beacon transmission process in a router according to an embodiment of the present invention.

FIG. 5 is a flowchart of a beacon transmission process in a router according to an embodiment of the present invention.

All beacons of the routers in a ZigBee network are scanned and represented in a table (operation S510).

Beacon payloads in the table are analyzed to identify beacon slot numbers of the routers (operation S520).

A parent router to be connected is selected among the routers (operation S530), and unused beacon slot numbers, excluding the identified beacon slot numbers, are distinguished from among beacon slot numbers allocated within a beacon interval of the selected parent router (operation S540).

One of the unused beacon slot numbers is selected, and beacons of the router are transmitted within a beacon interval based on a difference between a beacon slot number of the selected parent router and the selected unused beacon slot number (operation S550).

As described above, according to the present invention, a likelihood of beacon overlapping is reduced through efficient beacon slot selection in an initialization process and sensing of overlapping. Nevertheless, if beacon overlapping occurs, the sink node can detect the problem and take a proper process by a minimal amount of computations using a minimal memory, so that beacons can be transmitted without overlapping in a sensor network in a beacon mode.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A beacon scheduling method for preventing beacon overlapping in a ZigBee network including routers each with a beacon slot number according to a specific time slot, the method comprising:
   (a) identifying beacon slot numbers of routers existing in the ZigBee network by scanning beacons of the routers;
   (b) selecting a parent router to be connected among the routers;
   (c) distinguishing unused beacon slot numbers, excluding the identified beacon slot numbers, among beacon slot numbers allocated within a beacon interval; and
   (d) selecting one of the unused beacon slot numbers and transmitting beacons based on a difference between a beacon slot number of the selected parent router and the selected unused beacon slot number;
   (e) transmitting a message from a router with an allocated beacon slot number among the routers in the ZigBee network to a sink node in the ZigBee network, the message containing the allocated beacon slot number of the router and a scan time; and
   (f) if there is a router with the same allocated beacon slot number or the same scan time as in the message, transmitting a reset command to delete the beacon slot number of one of the two routers, wherein (f) comprises:
   determining whether an allocated beacon slot number of a router which will transmit beacons is the same as the allocated beacon slot number included in the transmitted message;
   if the allocated beacon slot numbers of the two routers are the same, calculating a scan time interval using a difference between the scan times of the two routers; and
   if the calculated scan time interval is not greater than the product of multiplying a beacon interval of the routers by a predetermined integer, transmitting a reset command for system initialization to one of the two routers after the time corresponding to the product passes.

2. The beacon scheduling method of claim 1, wherein (a) identifying the beacon slot numbers of the routers is achieved by analyzing beacon payloads included in the scanned beacons.

3. The beacon scheduling method of claim 1, wherein, in (d), a beacon slot number adjacent to the beacon slot number of the selected parent router is selected as one of the unused beacon slot numbers.

4. The beacon scheduling method of claim 1, wherein, in (d), a beacon slot number corresponding to a value obtained as a result of operation with a modular operator is selected using the value obtained by adding the beacon slot number of the selected parent router to the value of dividing a ZigBee network address of a router which will transmit beacons into a predetermined integer.

5. The beacon scheduling method of claim 1, wherein (d) comprises calculating a delay time according to the difference between the beacon slot number of the selected parent router and the selected unused beacon slot number, and beacons are transmitted after the calculated delay time passes from receiving beacons of the parent router.

6. The beacon scheduling method of claim 1, wherein, if one of the unused beacon slot numbers selected in (d) is a beacon slot number selected for another router in the ZigBee network, the selected parent router refuses connection of a router which will transmit beacons or transmits a reset command for system initialization to the router which will transmit.

7. The beacon scheduling method of claim 1, wherein, in (f), the reset command is not transmitted to any routers out of a radio wave reaching distance in which the sink node exists.

* * * * *